Feb. 20, 1968

F. V. TADDEO ET AL 3,370,266

FREQUENCY SYNTHESIZING SYSTEM

Filed Sept. 13, 1965

INVENTOR.
FAUSTO V. TADDEO,
DONALD W. BAKER,

BY J. K. Haskell

ATTORNEY.

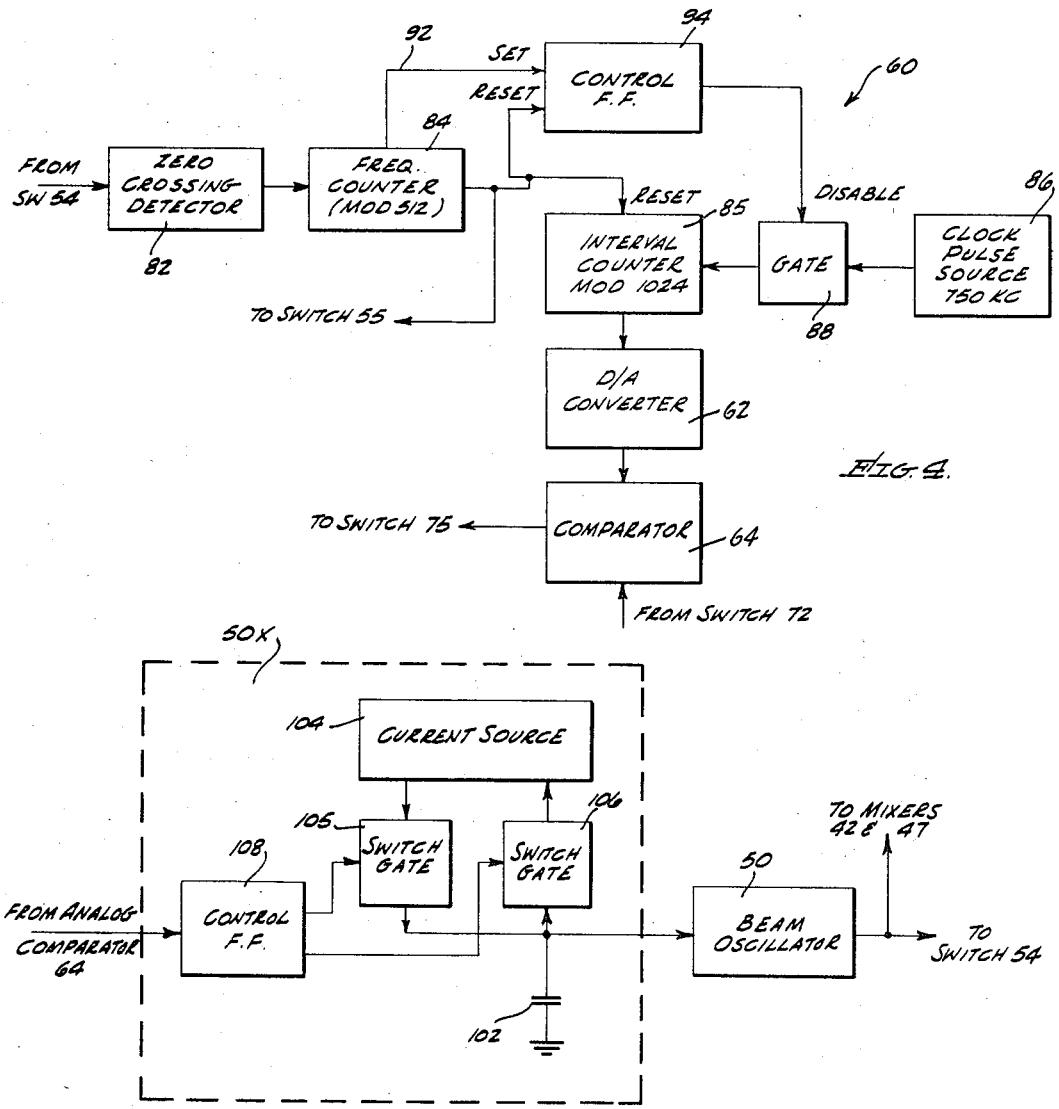

United States Patent Office 3,370,266
Patented Feb. 20, 1968

3,370,266
FREQUENCY SYNTHESIZING SYSTEM
Fausto V. Taddeo and Donald W. Baker, Anaheim, Calif., assignors to Hughes Aircraft Company, Culver City, Calif., a corporation of Delaware
Filed Sept. 13, 1965, Ser. No. 486,623
15 Claims. (Cl. 340—3)

ABSTRACT OF THE DISCLOSURE

A system for generating a plurality of frequencies which are individually controlled as a function of a plurality of control signals. The difference between the frequencies of the plurality of oscillators and a predetermined frequency are sequentially sampled by a frequency digitizer which in association with a digital to analog converter provides a series of analog signals representative of the frequencies of the oscillators relative to the predetermined frequency. The control signal related to a particular oscillator and the portion of the analog signal representing the output frequency of that particular oscillator relative to the predetermined frequency as compared in a comparator. The output signal of the comparator is synchronously switched to the oscillators to adjust the output frequency thereof to nullify any error. The comparator is time shared with each one of the plurality of oscillators and control signals in such a manner that the output frequencies of the oscillators are accurately and precisely controlled; each one of them producing an accurate and stable frequency within prescribed limits.

---

The present invention relates to controlled frequency oscillators and, more particularly, to a frequency synthesizing system for developing highly accurate and stable frequencies which are individually controllable as a function of independent variables.

In modern sonar systems, techniques have been developed to simultaneously form a plurality of beam signals. Each beam signal is formed by summing the signals received from a number of omni-directional sonar receivers or hydrophones properly delayed to yield a highly directional receiving characteristic, often referred to as a beam. Early sonar systems generally formed only one such beam signal at any given time. However, in modern sonar systems, a number of such beam signals are simultaneously formed so that signals comprising the energy received from each direction are continuously available. Such systems are often referred to as preformed beam systems.

Since, in most cases, a sonar-system-carrying ship is in motion, the entire spectrum of the received beam signals which includes noise is shifted in frequency. In each beam signal, the frequency shift, known as the Doppler frequency shift, is proportional both to the velocity of the ship through the water and to the cosine of the angle between the ship's center line and the beam pointing angle. Modern sonar receivers employ various processing techniques which require that the ship-induced Doppler frequency shift, hereafter referred to as the ship's Doppler component, be eliminated.

In one known technique, for each received beam signal, the frequency thereof is mixed with a frequency generated by a local oscillator. The frequency of the signal generated by the local oscillator is varied by an amount related to the ship's Doppler component for the particular beam signal. Generally, it can be stated that the ship's Doppler component for each beam signal is related to the ship's speed and the relative directional orientation of the beam with respect to the ship. Thus, the frequency of the signal of the local oscillator associated with each beam signal must be varied as a function of independent variables, namely the speed of the ship and the directional orientation of the beam with respect to the ship. The adjusted frequency of the oscillator's signal must be highly accurate and stable in order that the signals in the received beam related to a particular target may be accurately processed. The frequency stability of each of the individually controllable oscillators should be within one cycle per second (c.p.s.) in order to be compatible with the needs of most modern sonar systems.

As is well known in the art, it is quite difficult to provide such a highly accurate and stable frequency with an oscillator, the frequency of which must be controllable as a function of independent variables. The problem is greatly compounded when a plurality of oscillators must be simultaneously controlled. Due to such difficulties, most prior art systems nullify the effect of the ship's motion, i.e. the ship's Doppler component, in only one direction, or for one beam signal at a time. Thus, simultaneous analysis of all the beam signals comprising the energy received from all directions by the sonar processor is not possible. Attempts have been made to manually control the frequencies of a plurality of oscillators so that all the beam signals could be simultaneously corrected for the ship's Doppler component. However, such techniques have been found to be very complex and unreliable, requiring extensive equipment which must be frequently realigned.

Accordingly, it is an object of the present invention to provide a system for developing a highly accurate and stable set of frequencies which are made individually controllable as a function of independent variables.

Another object of the invention is to provide a novel system for simultaneously eliminating the ship's Doppler component from received beam signals representing the energy received from a plurality of directions.

Still another object of the invention is the provision of a frequency synthesizing system for developing a highly accurate and stable set of frequencies which are made individually controllable as a function of a set of independent variables, such as motion of a moving ship and direction orientation with respect thereto.

A further object of the present invention is to provide a frequency synthesizing system, used in conjunction with a sonar system employing a plurality of received beam signals comprising energy received from directions which are fixed relative to a sonar-system-carrying ship, to produce simultaneous nullification in the plurality of the beam signals of the Doppler frequency shift produced by the moving ship.

Yet another object of the present invention is to provide a frequency synthesizing system to control the accuracy and stability of a set of frequencies produced by a set of individually controllable frequency oscillators, the frequencies being controllable as a function of the speed of a moving ship and directional orientations with respect thereto.

Still a further object of the present invention is to provide a novel system used in conjunction with a sonar system for simultaneously nullifying the effect of Doppler frequency shifts, produced due to the speed of a sonar-system-carrying ship and the direction of orientation of each of a plurality of received beams with respect thereto, so that sonar information related to any targets about the ship may be accurately derived.

These and other objects of the invention are achieved by providing a frequency synthesizing system in which each beam signal is mixed with a signal of a local oscillator. The frequency of the signal of each local oscillator is sensed by a closed-loop frequency sensing servo which adjusts the frequency of the oscillator's signal as a function of the ship's Doppler component related to the particular beam signal so that the output signal of the mixer is related to the beam signal independent of the effects of any Doppler frequency shifts.

In essence, in the sensing servo, a signal corresponding to the ship's Doppler component, related to each beam signal, is compared with the actual frequency of the local frequency oscillator mixed with the particular beam signal. The difference between the two compared signals is used as an error signal to drive the oscillator to the required frequency so that the frequency of the signals supplied to a sonar processor is independent of Doppler frequency shifts. The comparison is performed in a comparator which is time shared by sequencing each of the plurality of oscillators at a sequencing rate, such that the frequency change in each of the oscillators due to variation in the ship's speed between correction cycles does not exceed predetermined limits.

Briefly, for each beam signal, the frequency synthesizing system of the present invention provides a unique signal which is a function of the ship's Doppler component related to the beam signal. The frequency of the oscillator's signal which is associated with the particular beam signal is converted into a related signal. The two signals, one which is a function of the ship's Doppler component, and the other related to the frequency of the oscillator's signal associated with the particular beam, are compared in a comparator to provide an error signal which is used to adjust the frequency of the oscillator's signal to correctly nullify its error. By time sharing the comparator, the frequencies of all the signals of the local oscillators are accurately and precisely controlled, each one of them producing an accurate and stable frequency within predetermined limits. Thus, all the beam signals comprising of energy received from all directions are simultaneously corrected.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4 is a detailed block diagram of one portion of the arrangement of FIGURE 3;

FIGURE 5 is a detailed block diagram of an analog frequency control circuit shown in FIGURE 3.

Figure 1:
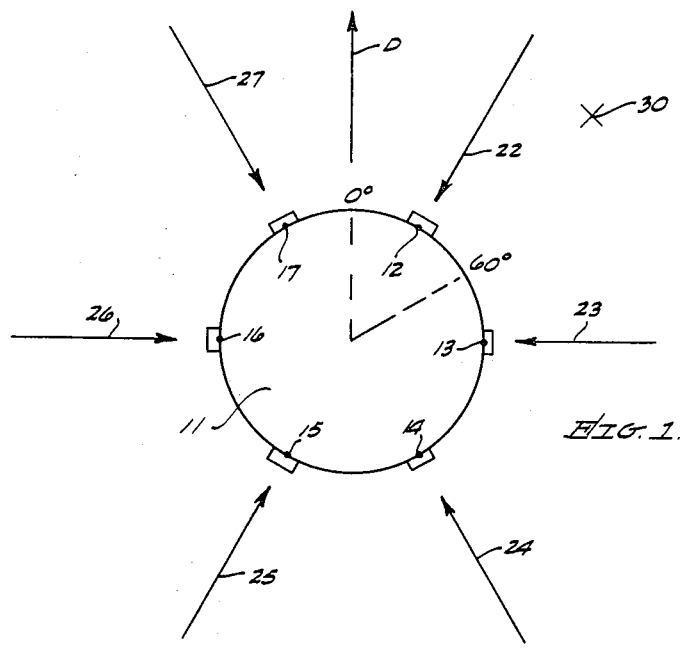
FIGURE 1 is a simplified diagram of a receiver array useful in explaining the formation of a plurality of beam signals.

For a better understanding of the present invention and the advantages thereof, reference is first made to FIGURE 1 which is a simplified diagram of a receiver array 11 of a sonar system. The array is shown comprising a plurality of detectors 12–17 which for explanatory purposes only, are limited to six. The detectors are equidistantly spaced about array 11. In the art of sonar, techniques are presently known whereby the signals received by the various detectors are combined into a plurality of beam signals which comprise the energy received from different directions or azimuth angles, indicated in FIGURE 1 by arrows 22 through 27 which hereafter will also be referred to as beam signals 22 through 27. The signals which are received from a particular azimuth angle comprise of noise and signals transmitted by a sonar transmitter which have been reflected by an unidentified target. The characteristics of the beam signals are analyzed in a sonar processor to derive range and azimuth of any unidentified target. Thus, for example, beam signal 22 which comprises energy received from an azimuth range of 0° to 60° may be used to derive the range and azimuth of a target 30 located within its particular azimuth angle. A few of the techniques of beam forming are described in Section 7.7 of "Introduction to Radar Systems" by Merrill I. Skolnik, published by McGraw-Hill Book Company in 1962, Library of Congress Catalog Card No. 61–17675.

It is appreciated by those familiar with the art that any motion of target 30 may be derived by known Doppler measurement techniques, in which the frequency of the beam signal 22 is analyzed with respect to the frequency of signals transmitted to and reflected by the target. Such techniques are well known in the art and have extensively been used in both radar and sonar systems. It should be appreciated however, that when the array 11 is mounted on a ship (not shown) moving in a direction designated by arrow D, the frequency of the received beam signal is affected, not only by the Doppler shift produced by a moving target, such as target 30, but also by the speed of the ship and the orientation of the direction from which the energy is received with respect thereto.

The effect of the ship's speed on the frequencies of the beam signals is the same. However, since the orientation of the direction from the received energy comprising each beam signal with respect to the moving ship differs, the Doppler shift affecting each beam signal is different. Hereafter, the Doppler shift, produced by the ship in each beam signal, will be referred to as the ship's Doppler component and can be expressed as $\Delta f_o = KV \cos \theta$, where K is a constant, V is the ship's speed and $\theta$ is the angle between the ship's center line and the center line of the azimuth angle of the direction from which energy comprising a beam signal is received. This angle is commonly referred to as the beam angle off the bow. For the beam signals 22, 23, 24, the ship's Doppler components are $KV \cos 30°$, $KV \cos 90°$, and $KV \cos 150°$ respectively. Due to the symmetry of orientation of the various beam signals about the ship's center line, the ship's Doppler components of beam signals 27, 26 and 25 equal those of signals 22, 23 and 24 respectively.

From FIGURE 1, it should be appreciated that each pair of beam signals, such as 22 and 27, has a unique ship's Doppler component ($KV \cos 30°$) which must be compensated for or nullified before the beam signal can be analyzed to provide information related to unidentified targets in the azimuth angles related thereto. Also, since the ship's Doppler component for each specified beam signal is a function of velocity which is subject to constant variation, the ship's Doppler component is a variable. Despite such variations, the compensation must be very accurate, within one c.p.s., so that the data related to the unidentified target is sufficiently accurate for the needs of the most modern sonar systems.

Figure 2:
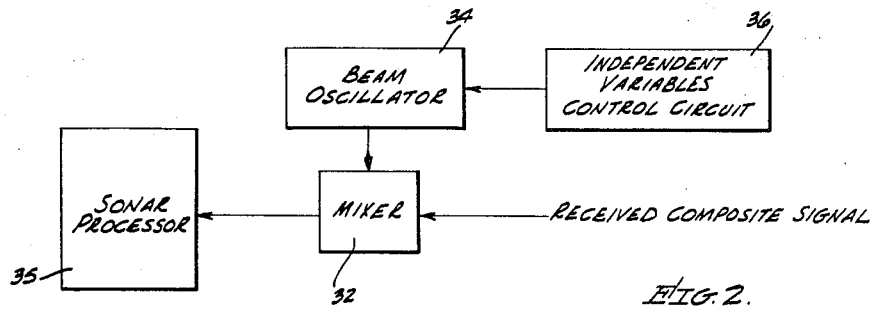
FIGURE 2 is a simplified block diagram of one channel of the system of the present invention.

One technique used to compensate for the ship's Doppler component may be best explained in conjunction with the arrangement of FIGURE 2 to which reference is made herein. As shown, the arrangement includes a frequency mixer 32 to which a beam signal is supplied. The mixer is also connected to a beam oscillator 34 so that the output frequency of the mixer 32 supplied to a sonar processor 35 is a function of the difference between the frequencies of the beam signal and a center frequency $f_c$ of the oscillator. The difference between the frequencies $f_m$ may be mathematically expressed as $f_m = f_t - f_c$, where $f_t$ is the frequency of the beam signal and $f_c$ is the oscillator's center frequency.

It is appreciated that the center frequency $f_c$ of oscillator 34 is chosen by the designer of the processor as a function of where the desired frequency spectrum of the input signals is to be located in the frequency domain.

The oscillator 34 is connected to a control circuit 36 which controls the output frequency of the oscillator to be $f$, where $f = f_c \pm \Delta f\theta$, $\Delta f\theta$ representing the ship's Doppler component. $\Delta f\theta = 0$ when $V = 0$ or when $\cos \theta = 0$, so that the frequency of oscillator 34 is $f=f_c$. However, if the ship's Doppler component ($\Delta f\theta$) is not zero, then the control circuit 36 modifies the output frequency ($f$) of oscillator 34 to be greater or less than $f_c$. Thus, the frequency of the output of the mixer is at all times independent of the ship's Doppler component.

However, in order to accurately cancel or nullify the ship's Doppler component, the frequency of the oscillator must be precisely controlled for each fixed value of V and $\theta$. Yet, despite being a function of independent variables, the frequency should be stable to within 1 c.p.s. Since within each symmetrical beam pattern, the ship's Doppler component for two symmetrical beams is the same, one oscillator is sufficient to compensate for the ship's Doppler component of two beams. Thus for the array of FIGURE 1, three oscillators are needed to control the six beams shown.

Figure 3:
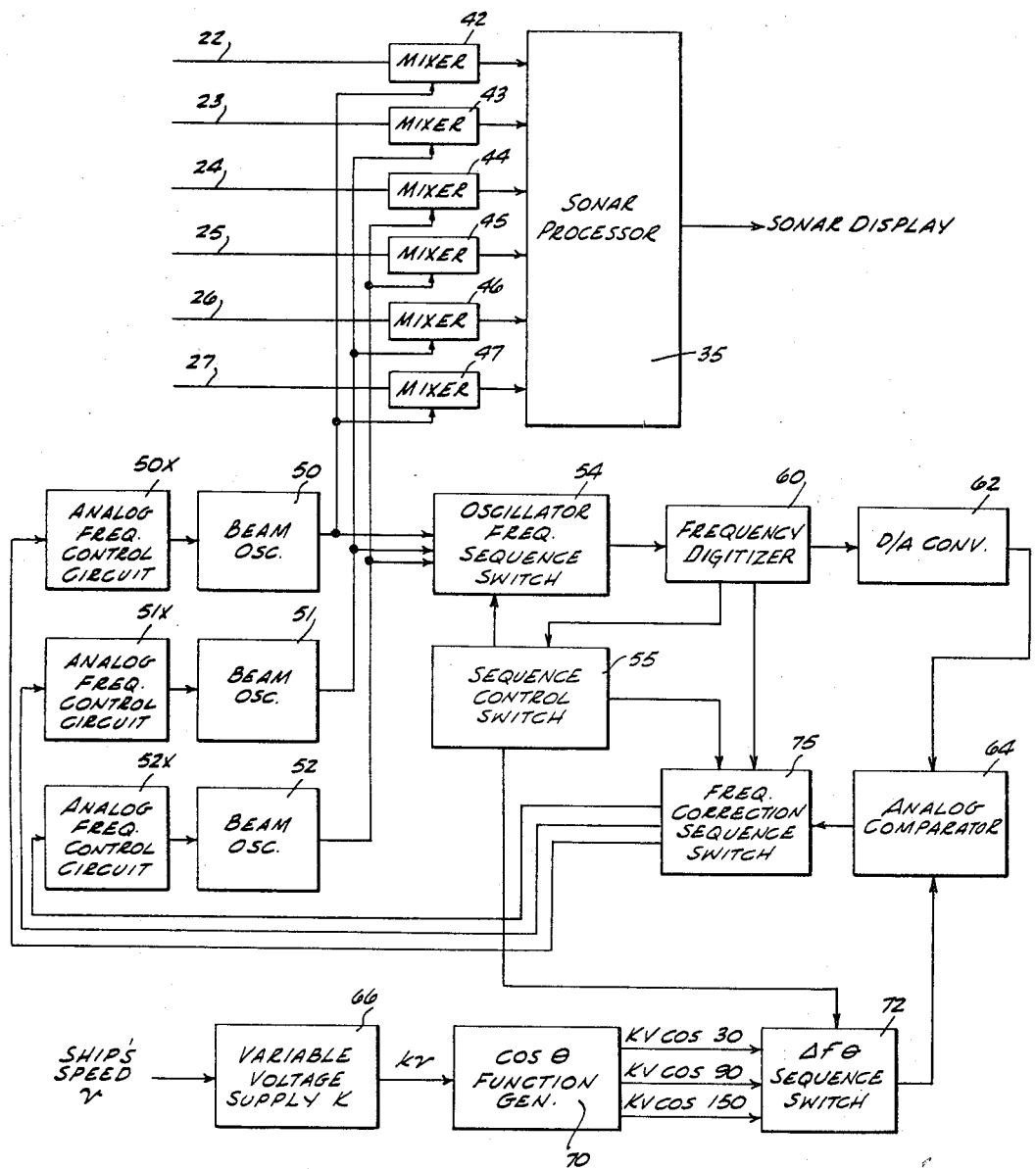
FIGURE 3 is a block diagram of the frequency synthesizing system of the present invention.

Reference is now made to FIGURE 3 which is a simplified block diagram of the novel frequency synthesizing system of the present invention. The system is explained in conjunction with the particular received beam array, shown in FIGURE 1, comprising six beam signals designated by numerals 22 through 27. As seen from FIGURE 3, beam signals 22 through 27 are supplied to a sonar processor 35 through mixers 42 through 47 respectively. Since beam signals 22 and 27 are symmetrically arranged with respect to the center of the receiving array 11 (FIGURE 1), the mixers associated therewith, i.e. mixers 42 and 47 are connected to the output of a single beam oscillator 50. Similarly, symmetrical beam signals 23 and 26 are connected to the output of another beam oscillator 51 and symmetrical beam signals 24 and 25 are connected to the output of a beam oscillator 52. From the foregoing, it should be appreciated that the function of oscillators 50 through 52 is to mix the frequency of the signals in the various received beam signals and compensate for the ship's Doppler component of each one of the signals so that the output of each of the mixers is independent of the ship's Doppler component.

The sinusoidal output of each of the oscillators 50, 51 and 52 is supplied to an oscillator frequency sequence switch 54 which is controlled by a sequence control switch 55. The function of switch 55 is to control the system of the invention, to sequentially sample the frequency of each one of the oscillators and determine whether its frequency deviates by a proper amount from its center frequency, hereinbefore designated as $f_c$, to compensate for the ship's Doppler effect for the particular beam signal. For explanatory purposes only, let it be assumed that the system is sampling the frequency of oscillator 50. Then, oscillator frequency sequence switch 54 is energized to supply the frequency of oscillator 50 to a frequency digitizer 60, whose output is connected to a D/A converter 62. The function of the frequency digitizer 60, which will hereafter be explained in detail, is to provide a digital output indicative of the deviation of the frequency of oscillator 50 from its center frequency $f_c$. Such deviation is converted by the D/A converter 62 into an analog output which is supplied to an analog comparator 64.

Since the ship's Doppler component for each one of the beam signals is a function of the ship's speed and the directional orientation of the received energy comprising each particular beam signal with respect to the ship, the present system includes a variable voltage supply 66 which is provided with the ship's speed V supplied thereto from another part of the sonar system. The output of the voltage supply is therefore a function of the ship's speed and is supplied to a cosine $\theta$ function generator 70 which has a plurality of outputs each one connected to a $\Delta f\theta$ sequence switch 72. The cosine $\theta$ function generator may be of the voltage divider type, providing a plurality of outputs, each one being a function of KV and the cosine of a particular angle related to the angle of deviations of the various beam signals with respect to the ship's orientation (FIGURE 1).

For the array 11, shown in FIGURE 1, the three outputs of the function generator 70 are proportional to KV cos 30, for correcting the frequency of beam signals 22 and 27, $KV$ cos 90 for correcting the beam signals 23 and 26, and KV cos 150 for correcting the received beam signals 24 and 25 respectively. From FIGURE 1, it is seen that beam signals 23 and 26 are both broad side signals and that the cosine $\theta$ for these signals is zero (cos 90°=0). Thus, the oscillator 51 associated therewith can be of the fixed frequency type. However, the description of correcting these beams has been included in order to describe the novel teaching of the invention in as complete a manner as possible.

When the frequency of oscillator 50 is being sampled, the sequence switch 72 is energized to supply the signal KV cos 30 to the analog comparator 64. The analog comparator consists of a circuit which produces an output which is in either of two states, hereafter referred to as a "one" output or a "zero" output. The one output is produced when the signal from converter 62 is greater than the signal from switch 72. When the signal from switch 72 is the greater of the two, the zero output is produced. The output of the comparator 64 may be thought of as being of either a logical one or a logical zero.

The comparator 64 is connected through a frequency correction sequence switch 75 to analog frequency control circuits $50x$, $51x$ and $52x$ which control the frequency of oscillators 50, 51 and 52, respectively. Each of the control circuits $50x$, $51x$ or $52x$ includes an input control flip-flop which will be described hereinafter in detail. The flip-flop is controlled so that when the output of comparator 64 is a one, the flip-flop is set causing the frequency of its respective oscillators to increase. Then when the output of comparator 64 is a zero, the flip-flop is reset causing the frequency to decrease. When the signals supplied to the comparator 64 are equal, the stable state of the flip-flop remains as it was during a previous sampling period. Thus, the frequency of the oscillator increases or decreases depending on whether the flip-flop was previously set or reset.

After sampling and controlling the frequency of oscillator 50, control switch 55 controls switches 54, 72 and 75 to sequentially sample the frequencies of oscillators 51 and 52 by controlling their respective frequencies with signals supplied to analog frequency control circuits $51x$ and $52x$ in a manner similar to that hereinbefore described. After sampling the frequencies of the three oscillators, the sampling cycle is then repeated again to determine whether the frequencies of any of the oscillators have deviated by more than a given value, such as one cycle per second, from the desired frequency. Thus, within each sampling cycle, each oscillator is sampled and its frequency increased or decreased to insure that its output frequency is within one cycle of the frequency necessary to compensate for the ship's Doppler component of each of the receiving beam signals hereinbefore described.

The mode of operation of the frequency digitizer 60 which converts the frequency of each one of the oscillators into a digital signal, indicative of the deviation of the frequency of the oscillator from its center frequency $f_c$, may best be explained in conjunction with FIGURE 4 to which reference is made herein. The digitizer 60 includes a zero crossing detector 82 which sequentially receives the sinusoidal output of each of the oscillators (through sequence switch 54) and converts them to pulses, counted by a frequency counter 84. Arbitrarily, counter 85 is chosen to be a 512 pulse counter. The digitizer also includes an interval counter 85 which is assumed to be a modulo 1024 pulse counter. It is connected to a clock pulse source 86 through a gate 88. The source 86 is assumed to provide pulses at a rate of 750 kc.

At the initiation of a sampling cycle, such as when oscillator 50 is sampled, switch 54 enables the sinusoidal output of oscillator 50 to be supplied to detector 82. At the same time, gate 88 is enabled, so that counter 85 counts the pulses from source 86. When counter 84 reaches a state corresponding to a fixed number of cycles of oscillator 50, such as for example 511 cycles, a pulse is supplied from counter 84 via line 92 to set a control flip-flop 94. When flip-flop 94 is set, it interrupts the pulses supplied to counter 85 by disabling gate 88.

Since the interval counter 85 is driven at a fixed rate (750 kc.), its state, at the moment it is interrupted, is a function of the time interval which has elapsed in the process of counting a specified number of cycles (511) at the output of the oscillator 50. The relative counting rate of the two counters is such that the interval counter recycles a number of times during the frequency sampling period. However, the timing relationship of the counters is selected so that the sample frequency input equal to the design center frequency $f_c$ of 10 kc. of the oscillator 50 will result in the interruption of the interval counter 85 at the middle of its range.

Deviations in the state of the interval counter above or below this center value may, therefore, be interpreted as variations in the oscillator's frequency below or above its center frequency. The recycling characteristic of the interval counter 85 in effect provides a vernier measurement of the cycle count interval and consequently the frequency deviation of the oscillator 50 above its center frequency $f_c$. The output of the counter 85 is converted by the D/A converter 62 into a DC voltage of magnitude and polarity which are proportional to the degree and direction of deviation of the frequency of oscillator 50 with respect to its center frequency $f_c$ equaling 10 kc.

Simultaneously with the interruption of the interval counter 85, occurring when the count in counter 84 equals 511, an enable signal is sent to the frequency correction sequence switch 75, which includes a bank of gates, one gate per oscillator. The enable signal which is used as an And gate input terminal to each gate enables the output of the analog comparator 64 to be applied to the appropriate analog frequency control circuit (such as 50x) to control the frequency of its respective oscillator (such as 50).

From the foregoing description, it should be apparent that the signal from the function generator 70 represents the ship's Doppler component of a particular beam signal by which the center frequency of the oscillator controlling the particular beam signal must be varied with respect to its center frequency. On the other hand, the analog signal from converter 62 represents the degree or direction of deviation of the frequency of the oscillator with respect to its center frequency. Thus, comparator 62 compares the two signals and generates an output, the polarity (one or zero) of which indicates whether the frequency of the oscillator is too high or too low with respect to the frequency necessary to properly compensate the particular beam for the ship's Doppler components. The output of comparator 64 is supplied through the sequence switch 75 to the analog frequency control circuit which controls the frequency of the oscillator 50. Thus, depending on the polarity of the output of analog comparator 64, the control circuit either increases or decreases the signals supplied to its respective oscillator in order to properly adjust the frequency thereof.

During the next state of the frequency counter 84, the counter reaches its full state and is reset. The full state of counter 84 is used to reset flip-flop 94 as well as interval counter 85 and energize sequence control switch 55 (FIGURE 3) in order to initiate a counting or sampling cycle for the next oscillator. Since it is assumed that counter 84 is driven at a rate about 10 kc., the interval between the time when counter 84 reaches a count of 511 and the time it reaches the count 512 is approximately equal to one hundred microseconds which is sufficient for the comparator 64 to perform the necessary comparison and for the analog frequency control circuit 50x to adjust the frequency of oscillator 50.

Attention is now called to FIGURE 5 which is a simplified diagram of the analog frequency control circuit 50x, shown coupled to control the frequency of oscillator 50. Circuits 51x and 52x are identical to that of circuit 50x, which comprises an analog storage device, diagrammed as a capacitor 102 which is connected to the input of oscillator 50. The charge or voltage across the capacitor 102 is used to control the frequency of oscillator 50 which is assumed to be a voltage controlled oscillator. The capacitor is connected to an infinite impedence current source 104, through switches 105 and 106, which are controlled by a control flip-flop 108, herebefore mentioned. When flip-flop 108 is in a set state, switch 105 is enabled to permit the current source 104 to charge capacitor 102 at a fixed linear rate. Thus, the voltage across capacitor 102 increases linearly and consequently increases the output frequency of oscillator 50. On the other hand, when flip-flop 108 is in a reset state, switch 106 is enabled, permitting the capacitor to linearly discharge through source 104 at the same fixed rate, thereby decreasing the voltage across the capacitor, which in turn results in a decrease of the output frequency of oscillator 50.

It should therefore be appreciated that when flip-flop 108 is set, the frequency of the oscillator increases at a predetermined rate, which in one actual reduction to practice was equal to six c.p.s., while the frequency decreases at the same rate when flip-flop 108 is reset. Thus, by controlling the setting and resetting of flip-flop 108, the output frequency of oscillator 50 is controlled. Further, it should be apparent that the rate at which flip-flop 108 is controlled affects the accuracy at which the frequency of oscillator 50 can be maintained. For example, if flip-flop 108 is controlled (set or reset) at the rate of once a second, the output frequency of the oscillator can be maintained to within ±6 cycles per second. However, by increasing the rate of controlling the flip-flop 108, the output frequency can be maintained within closer accuracy or limits. All that is necessary to maintain the frequency within one cycle per second is to control the flip-flop once each one-sixth second or oftener. Flip-flop 108 may be controlled by providing it with an input signal of a first polarity to reset the flip-flop and an input of a second polarity to set it.

As previously explained, when the frequency of oscillator 50 is sample, the comparator 64 provides an output, the polarity of which indicates whether the frequency is too high or too low. From the foregoing, it should be appreciated that since oscillator 50 is to compensate for the ship's Doppler component of beam signals 22 and 27, its frequency should be $f=f_c+KV \cos \theta$. Thus, if when sampling the frequency of oscillator 50, it is found that the frequency of the oscillator is greater than $f$, i.e. the frequency deviates by more than $KV \cos \theta$ from the center frequency $f_c$, then the analog signal from converter 62 will be greater than that from the signal from generator 70. As a result, an output of a first polarity will be supplied to reset flip-flop 108 so that the frequency of oscillator 50 is lowered. The frequency of the oscillator will decrease at the rate of six cycles per second. Then, during the next sampling of the frequency of oscillator 50, if the frequency becomes too low, comparator 64 will provide an output signal of a second polarity which in turn will set flip-flop 108 and cause the frequency of oscillator 50 to increase. By controlling the sampling rate of each oscillator to be high enough, i.e. every one-sixth second or sooner, the frequency of oscillator 50 can be controlled to be within plus or minus one cycle per second. The frequencies of the other oscillators (51 and 52) are similarly controlled.

Figure 6:
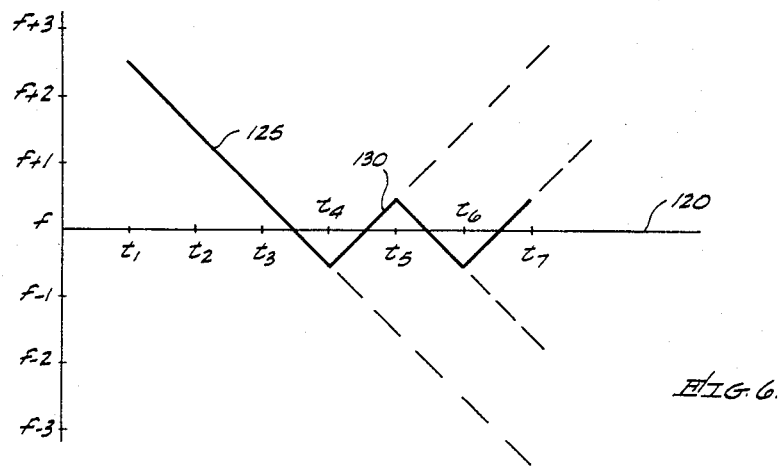
FIGURE 6 is a frequency diagram useful in explaining the novel teachings of the invention for controlling the frequency of each oscillator within predetermined limits.

Referring to FIGURE 6, there is shown a simplified diagram, the ordinate of which represents frequency and the abscissa denoting time. Solid line 120 represents the desired frequency $f$ of one of the oscillators, such as oscillator 50, and $t_1$ through $t_7$ represents sampling times of the output of oscillator 50. Let us assume that the system is energized and at time $t_1$ the output frequency is first sampled and is found to be too high (acutally $f+2.5$). Consequently, FF 108 is reset and the capacitor 102 discharges to reduce the frequency of oscillator at a rate of 6 c.p.s. as indicated by line 125. At each of sampling times $t_2$ and $t_3$, the frequency is still too high so that FF remains reset and the frequency continues to decrease. At $t_4$ the frequency is found to be too low, setting FF 108, which causes the frequency to increase at the rate of 6 c.p.s. as indicated by line 130. The frequency increases above $f$ so that at $t_5$ the FF 108 is again reset to cause a decrease in the oscillator's frequency. The process continues so that at each alternate sampling time, the frequency is either increased or decreased. By controlling the sampling rate to be high enough, the frequency can be maintained to be within ±1 c.p.s. even though the output frequency of the oscillator varies constantly at a fixed rate, such as 6 cycles per second.

Although in the foregoing, the invention has been described in conjunction with controlling three oscillators each to provide a frequency within ±1 c.p.s. which is a function of two independent variables (V and $\theta$), it is appreciated that the system can be used to control any number of oscillators. Generally in sonar systems, as many as 48 receiving beam signals are simultaneously formed so that 24 oscillators may be used to simultaneously correct each team signal by nullifying the ship's Doppler component therefrom. Each oscillator is controlled to produce a unique frequency $f$ c.p.s., where $f$ is a function of V and the particular $\theta$ of the two beam signals which the oscillator is to control. It should be appreciated that even though the invention has been described in conjunction with a sonar system, the novel teachings are not limited thereto. Rather, the system may be used to control one or more oscillators to provide one or more highly accurate frequencies, each one of which is made a function of independent variables. It should be noted that in the present invention, the actual output frequency of each oscillator is constantly varying between predetermined limits, such as $f+1$ and $f-1$ (see FIGURE 5). However, as long as the frequency does not exceed such limits, it is assumed to be accurate and stable.

There has accordingly been shown and described hereinbefore a novel frequency synthesizing system for controlling the accuracy and stability of the output frequency of a plurality of oscillators, each oscillator being controllable as a function of independent variables. It should be appreciated that the specific examples have been presented for explanatory purposes and that those familiar with the art may make modifications in the arrangements as shown without departing from the true spirit of the invention. Therefore, all such modifications are deemed to fall within the scope of the invention as claimed in the appended claims.

What is claimed is:

1. A system for generating a plurality of individually controllable frequencies comprising:
   a plurality of oscillators;
   means for providing an individual control signal to each of said oscillators;
   means for deriving a first analog signal sequentially indicative of the deviation of the frequencies of said oscillators from a predetermined frequency;
   means for sequentially comparing said individual control signals and the portion of the first analog signal derived from the oscillator related thereto, and providing an output control signal; and
   means responsive to said output control signal for sequentially controlling the frequency of each oscillator.

2. A system for controlling the frequency of an oscillator to a selected value comprising:
   an oscillator;
   means coupled to said oscillator for providing a frequency signal indicative of the deviation of the frequency of said oscillator from a predetermined frequency;
   means for providing a first control signal which represents the difference between said selected frequency and said predetermined frequency;
   means for comparing said frequency signal and said first control signal and providing a second control signal indicative of the directional deviation of the frequency of said oscillator with respect to said selected frequency; and
   means responsive to said second control signal for variably controlling the frequency of said oscillator to equal said selected frequency within predetermined limits.

3. A system for controlling, as a function of an independent variable, the output signal of an oscillator to be of a selected frequency $f$ comprising:
   a variably controllable oscillator for providing an output signal of a frequency related to an input signal supplied thereto;
   first means responsive to said output signal for providing a first signal which is a function of the deviation of the frequency of said output signal with respect to a predetermined frequency $f_c$;
   second means responsive to said independent variable for providing a second signal which is indicative of the difference between said selected frequency $f$ and said predetermined frequency $f_c$;
   third means responsive to said first and second signals for providing a third signal having characteristics which represent the directional deviation of the frequency of the output signal of said oscillator with respect to said selected frequency; and
   fourth means responsive to said third signal for supplying said oscillator with a controllably varying input signal to control the frequency of the output signal thereof to equal said selected frequency $f$ within predetermined limits.

4. The system of claim 3 wherein said first means include means for counting a predetermined number of cycles of the output signal of said oscillators in a period which is a function of the frequency of said output signal; a source of pulses; and
   means for counting pulses from said source during said period and providing as a function of the count therein at the end of said period a signal indicative of the deviation of the frequency of said output signal with respect to said predetermined frequency $f_c$.

5. The system of claim 4 wherein said first means provide a digital signal indicative of the deviation of the frequency of the output signal of said oscillator with respect to said predetermined frequency $f_c$, said system further including means for converting said digital signal to a first analog signal.

6. The system of claim 5 wherein said second means provide a second analog signal which is indicative of the difference between said selected frequency $f$ and said predetermined frequency $f_c$;
   said third means comprising analog comparing means responsive to said first and second analog signals for providing said third signal having a first polarity when the frequency of the output signal of said oscillator is greater than said selected frequency $f$ and a second polarity when the frequency of the output signal of said oscillator is smaller than said selected frequency $f$; and
   said fourth means including control means and analog means, said control means being responsive to said output signal of either said first or said second polarity for controlling said analog means to controllably vary the input signal supplied to said oscillator to control the frequency of the output signal thereof to equal said selected frequency within predetermined limits.

7. A frequency synthesizing system for generating a plurality of output signals and for individually controlling frequency of each output signal comprising:

oscillating means for generating a plurality of output signals;

first means responsive to a first of said output signals for providing a first signal which is a function of the deviation of the frequency of one of said output signals with respect to a predetermined frequency;

second means for generating a plurality of correction signals each signal being indicative of the difference between said predetermined frequency and the selected frequency of a different one of said output signals;

third means for comparing said first signal and the correction signal indicative of the difference between said predetermined frequency and the selected frequency of said first output signal and providing a first frequency control signal having characteristics which represent the directional deviation of the frequency of said first output signal with respect to the selected frequency thereof;

means responsive to said first control signal for controlling said oscillating means to variably adjust the frequency of said first output signal to equal the selected frequency thereof within predetermined limits; and sequencing means for sequentially providing each of said output signals to said first means, each of said correction signals to said third means and the control signal of said third means to said oscillating means to sequentially variably adjust the frequency of each of said output signals to equal the selected frequency thereof within said predetermined limits.

8. A frequency synthesizing system for generating $n$ output signals of selected frequencies $f1, f2, \ldots fn$, the frequencies being related to independent variables $\Delta f1, \Delta f2, \ldots \Delta fn$, each selected frequency being a function of a predetermined frequency $f_c$ and the independent variable associated with each selected frequency comprising:

$n$ oscillators $01, 02, \ldots 0n$ for providing $n$ output signals $S1, S2, \ldots Sn$;

frequency digitizing means for providing for each output signal a frequency signal indicative of the deviation of the frequency of the output signal with respect to said predetermined frequency;

first sequencing means for sequentially supplying said $n$ output signals $S1, S2, \ldots Sn$ to said frequency digitizing means to sequentially provide $n$ frequency signals $X1, X2, \ldots Xn$;

function generating means for generating a set of correction signals $Y1, Y2, \ldots Yn$ indicative of said independent variables;

comparing means for sequentially comparing one of said frequency signals and one of said correction signals to provide a control signal $Z$ indicative of the directional deviation of the frequency of each of said output signals with respect to the selected frequency thereof;

second sequencing means for sequentially supplying said $Y1, Y2, \ldots Yn$ correction signals to said comparing means to sequentially provide correction signals $Z1, Z2, \ldots Zn$; and means for controlling oscillators $01, 02, \ldots 0n$ with different ones of said correction signals $Z1, Z2, \ldots Zn$ to control the frequencies of said oscillators to equal said selected frequencies $f1, f2, \ldots fn$, each frequency being controllable within predetermined limits.

9. In a sonar receiving system aboard a moving platform wherein signals are combined to form a plurality of beam signals comprising energy received from different directions whose orientations are fixed relative to said moving platform a system for generating a signal of a selected frequency to compensate each beam signal for the effect of the speed of said platform and the orientation of the beam signal with respect thereto comprising:

a variably controllable oscillator for providing an output signal of a frequency related to an input signal supplied thereto;

first means responsive to said output signal for providing a first signal which is a function of the deviation of the frequency of said output signal from to a predetermined frequency $f_c$;

second means for generating a second signal as a function of the speed of said platform and the directional orientation of the energy comprising a beam signal with respect thereto;

third means responsive to said first and second signals for providing a third signal having characteristics which represent the directional deviation of the frequency of the output signal of said oscillator with respect to said selected frequency;

fourth means responsive to said third signal for supplying said oscillator with a controllably varying input signal to control the frequency of the output signal thereof to be equal to said selected frequency $f$ within predetermined limits; and means for mixing the output signal at said selected frequency with the signals of said beam signal to compensate for the effect of the platform's speed and the orientation of the direction of the received energy comprising the beam signal with respect thereto.

10. In a sonar receiving system aboard a moving platform wherein received signals forming beam signals, each beam signal comprising energy received from a direction whose orientation is fixed relative to said moving platform, are mixed with signals from an oscillator, the output of the mixer is supplied to a sonar processor to analyze the beam signal and provide data related to unidentified objects, a system for compensating said beam signal for the effect thereon of the speed of said moving platform and the orientation of the direction of the energy thereof with respect thereto comprising:

a variably controllable oscillator for providing output signals at a frequency which is a function of the input thereof;

mixing means;

means for supplying output signals of said oscillator at a first frequency and the received signals forming said beam signal to said mixing means; and control means, coupled to said oscillator, for automatically varying said first frequency of the output signals of said oscillator to a second frequency to compensate said received signals for the effect of the speed of said moving platform and the orientation of the direction of the energy comprising said beam signal with respect thereto, said control means including means responsive to the speed of said moving platform and the orientation of the direction of the energy with respect to said platform for generating a first control signal which is indicative of the difference between said first and second frequencies.

11. The system of claim 10 wherein said control means further include:

means responsive to the output signals of said oscillator for providing a second control signal which is a function of the deviation of the frequency of the output signals of said oscillator from said first frequency; and input control means responsive to said first and second control signals for variably controlling the input of said oscillator to control the frequency of the output signals thereof to equal said second frequency.

12. The system of claim 11 wherein said input control means include:

comparing means responsive to said first and second control signals for providing a third control signal having a first polarity when said first signal is greater than said second control signal and a second polarity when said first control signal is smaller than said second control signal; and analog input means for variably controlling the input to said oscillator as a function of the polarity of said third control signal to vary the frequency of the output signals of said oscillator at a predetermined rate.

13. In a sonar receiving system aboard a moving platform wherein received signals, forming a beam signal whose orientation is fixed relative to said moving platform, are mixed in a mixer with the output signals of an oscillator at a predetermined frequency, the output of said mixer being supplied to a sonar processor for deriving data from said receiving signals related to unidentified objects, a system for automatically compensating the received signals for the Doppler component which is a function of the speed of the moving platform and the orientation of said beam signal with respect to said moving platform by adjusting the frequency of the output signals of said oscillator to equal a selected frequency comprising:

a variably controllable oscillator for providing output signals at a frequency related to input signals supplied thereto;

frequency analyzing means responsive to the output signals of said oscillator for providing a first control signal which is a function of the deviation of the frequency of said output signals from said predetermined frequency;

Doppler component generating means for providing a second control signal indicative of the difference between said selected and predetermined frequencies as a function of the speed of said moving platform and the orientation of said beam signal with respect thereto;

means for comparing said first and second control signals for providing a third control signal having a polarity which is related to the difference between said selected frequency and the actual frequency of the output signals of said oscillator; and analog input means responsive to said third control signal for variably controlling the input signals supplied to said oscilator as a function of the polarity of said third control signal to control the frequency of the output signals of said oscillators to equal said selected frequency within predetermined limits.

14. The system of claim 13 wherein said frequency analyzing means include:

first counting means for counting a predetermined number of the output signals of said oscillator in a time period which is a function of the frequency of said output signals;

a source of pulses generated at a predetermined rate;

second counting means for counting pulses from said source of pulses during said time period; and output means responsive to the count in said second counting means at the end of said time period for providing a first control signal as a function of the count in said second counting at the end of said time period and a predetermined count representing said predetermined frequency.

15. The system of claim 14 wherein said analog input means include bistable means, analog storage means; and means for driving said bistable means to a first state in response to said third control signal of a first polarity to increase at a predetermined rate the input signals to said oscillator and for driving said bistable means to a second state when said third control signal is of a second polarity, to decrease the input signals to said oscillator at said predetermined rate, said oscillator being responsive to the varying input signals thereto for varying at a related rate the frequency of the output signals thereof.

References Cited

UNITED STATES PATENTS

| | | | |
|---|---|---|---|
| 2,859,433 | 11/1958 | Saxon et al. | 343—8 |
| 3,024,755 | 3/1962 | Brooks | 340—3 X |
| 3,087,121 | 4/1963 | Bell | 331—11 |
| 3,185,938 | 5/1965 | Pelosi | 331—14 X |
| 3,277,389 | 10/1966 | Venn | 331—2 |
| 3,287,655 | 11/1966 | Venn et al. | 331—14 |

RICHARD A. FARLEY, *Primary Examiner.*